March 25, 1930.  S. J. NORDSTROM ET AL  1,751,654
VALVE
Filed June 15, 1927
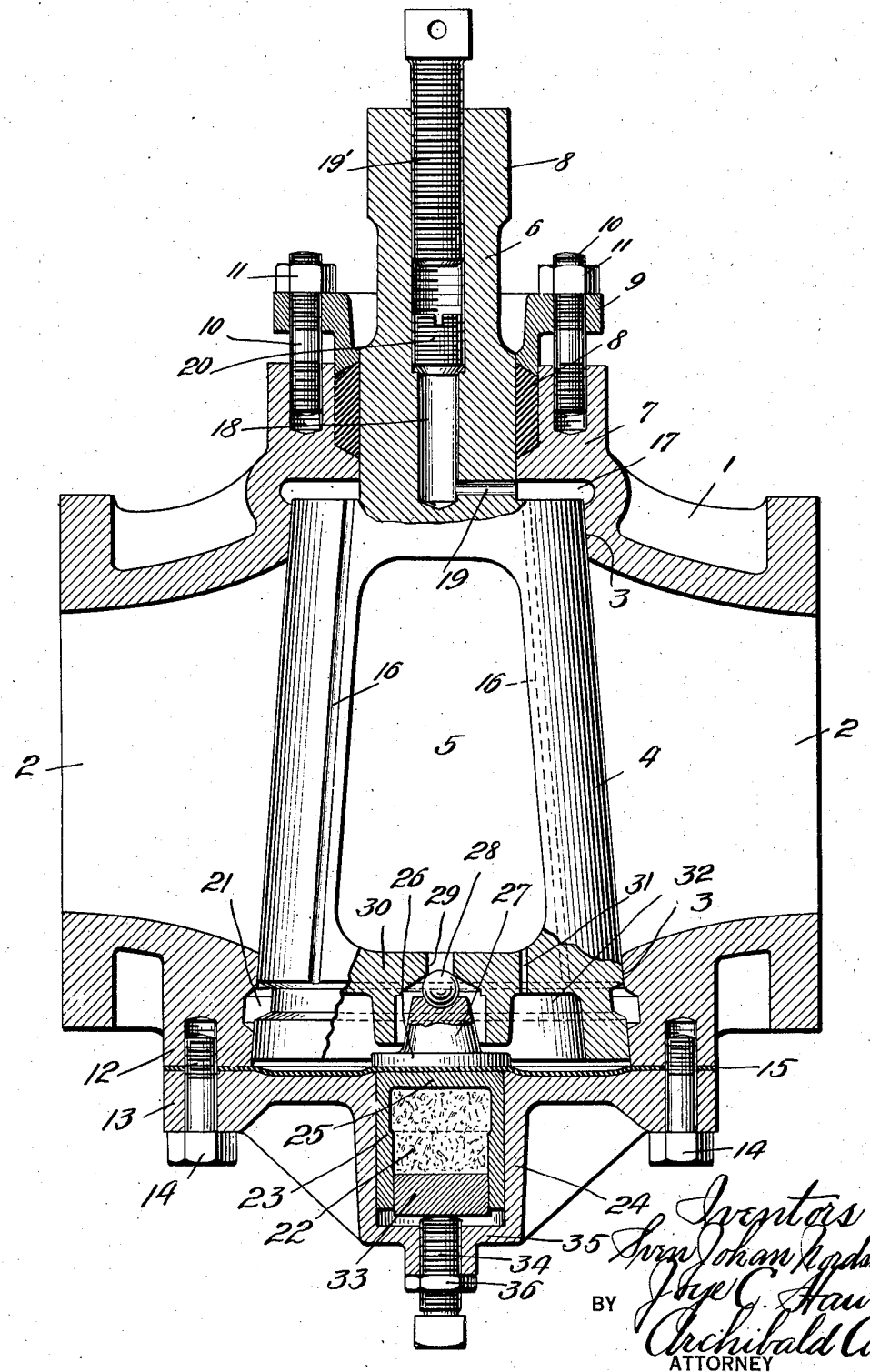

Patented Mar. 25, 1930

1,751,654

UNITED STATES PATENT OFFICE

SVEN JOHAN NORDSTROM, OF OAKLAND, AND JOYE C. HAUN, OF BERKELEY, CALIFORNIA, ASSIGNORS TO MERCO NORDSTROM VALVE COMPANY, OF SAN FRANCISCO, CALIFORNIA, A CORPORATION OF DELAWARE

VALVE

Application filed June 15, 1927. Serial No. 198,891.

The invention relates to an improvement in valves, and more particularly to an improvement in plug valves provided with means for resiliently holding the plug against the seat in the valve casing.

Many services in which plug valves are used subject the valves to high temperatures, acids, alkalis, and other conditions and substances which have a deteriorating effect upon the means for yieldingly holding the plug against its seat, destroying its resiliency and necessitating more or less frequent renewal or replacement of the member. And in those services which have no deleterious effect upon the resilient plug holding means long continued use will impair the resiliency of the member and require replacement. The object of the invention is to provide a plug valve with an improved resilient plug holding means which will not be affected by high temperatures, acids, alkalis, or other conditions or substances, and which will continue in use indefinitely without impairment of its resiliency. To this end the invention consists in the plug valve hereinafter described and particularly pointed out in the appended claims.

The plug valve illustrated in the accompanying drawing is of the pressure lubricated type and comprises a casing 1 provided with a longitudinal passageway 2 therethrough and a tapered valve seat 3 formed transversely of the passageway. A tapered plug 4 is seated in the valve seat 3 and is provided with a hole 5 adapted to register with the passageway 2 through a casing when the plug is turned to open position. As shown in the drawing, the plug is in closed position. The smaller end of the plug 4 is provided with a valve stem 6 which projects through the side 7 of the casing 1 and is adapted to receive on its outer end 8 the wrench or other means for manipulating the plug. The side 7 of the casing is formed as an annular flange surrounding the base of the valve stem 6 and providing an annular recess to receive the packing 8 held in compressed condition by the gland 9 adjustably secured to the part 7 of the casing by the studs 10 and nuts 11. The open lower side 12 of the casing is closed by a plate 13 held in position by the cap screws 14. Interposed between the side 12 of the casing and the plate 13 is a gasket 15, preferably of metal.

The lubricating system for the valve comprises the longitudinal grooves or channels 16 formed in the surface of the plug 4. At the smaller end of the plug the grooves 16 open into a chamber 17 formed in the part 7 of the casing 1 and into which the smaller end of the plug projects. The lubricant is supplied to the chamber 17 from a reservoir 18 formed axially in the valve stem 6 and connected at its lower end with the chamber 17 by the passageway 19. By turning the screw 19' threaded into the outer end of the stem 6 the lubricant in the reservoir 18 is put under pressure and forced into the chamber 17 and the channels 16. A check valve 20 located in the reservoir 18 prevents back flow of lubricant through the stem when the screw 19' is removed. At the larger end of the plug 4 the channels 16 communicate with the cooperating circumferential grooves 21 formed in the larger end of the plug and in the adjacent part of the casing.

The improved means for resiliently holding the plug 4 against the valve seat 3 in the casing 1 comprises finely-divided or powdered mica 22 confined in a housing 23 slidingly held in the central box-like part 24 of the plate 13. The closed inner end 25 of the housing 23 presses against the center of the outer surface of the gasket 15. Located on the other side of the gasket 15 opposite the housing 23 is the plate 26 of a support 27 of an antifriction or ball bearing 28 which seats in the other edge of the central hole 29 formed in the web 30 closing the larger end of the plug. The web 30 is pierced by the hole 31 which permits the fluid passing through the valve to enter the annular space 32 formed in the larger end of the plug and thereby assist in holding the plug against its seat.

The powdered mica in the housing 23 is adjustably compressed to hold the plug 4 with the desired degree of pressure against the valve seat 3 by means of a plug 33 loosely received in the outer open end of the housing 23. A screw 34 threaded into the closed outer end 35 of the box-like part 24 of the plate 13 bears against the outer surface of the plug 33. A check nut 36 holds the screw 34 in adjusted position. The fit of the plug 33 in the outer end of the housing 23 is such as to permit movement therein but prevent leakage of powdered mica under pressure.

In searching for suitable materials for resiliently holding the plug against its seat where the valve is employed in high temperature service, or for handling acids, alkalis, or other substances having a deleterious effect upon the resilient plug holding means heretofore used, we have found that powdered mica is an excellent resilient plug holding means under all conditions of service. The resiliency of the powdered mica is not affected by any degree of temperature to which the valve may be subjected, neither is it affected by acids, alkalis, or other substances, and severe conditions of use do not destroy the resilient properties of the powdered mica. However compactly the powdered mica may be compressed in the housing 23 by the plug 33 and the screw 34 to force the tapered plug 4 against the valve seat 3, and however long the valve may continue in service under this condition, immediately the screw 34 is turned to release the pressure on the mica the latter returns to its original condition.

It will be understood that the herein described use of powdered mica as a spring is only one illustration of its function of holding a movable member resiliently against a fixed member, and that accordingly the invention should not be restricted to the use herein described, since it is capable of other applications within the purview of the claims.

Having thus described the invention, what we claim as new is:—

1. A valve comprising, a casing having a passageway therethrough and a tapered valve seat formed transversely of the passageway, a cover having a central opening secured to the casing for closing the larger end of the valve seat, a gasket interposed between the casing and the cover, a tapered plug seated in the valve seat and having a hole adapted to register with the passageway, a bearing pressing at one end against the middle of the inner face of the gasket and at its other end against the larger end of the plug, a housing slidingly received in the hole in the cover and bearing at its inner end against the center of the outer face of the gasket, powdered mica contained in the housing, and means for putting the powdered mica under pressure to force the inner end of the housing against the gasket to hold the plug resiliently against the valve seat.

2. A valve comprising, a casing having a passageway therethrough and a tapered valve seat formed transversely of the passageway, a tapered plug seated in the valve seat and having a hole adapted to register with the passageway, a cover for closing the larger end of the tapered valve seat, powdered mica, and means interposed between the larger end of the plug and the cover for utilizing the powdered mica to hold the plug against its seat.

3. A valve comprising, a casing having a passageway therethrough and a tapered valve seat formed transversely of the passageway, a tapered plug seated in the valve seat and having a hole adapted to register with the passageway, and means including powdered mica for resiliently holding the plug against its seat.

4. A valve comprising, a casing having a passageway therethrough and a valve seat formed transversely of the passageway, a movable member seated in the valve seat and having a hole adapted to register with the passageway, and means including powdered mica for resiliently holding the movable member against its seat.

5. A valve comprising, a casing having a passageway therethrough and a valve seat formed transversely of the passageway, a movable member seated in the valve seat and having a hole adapted to register with the passageway, powdered mica, a housing adapted to contain the powdered mica, a movable plug entering the housing to confine the powdered mica therein, and means for exerting pressure on the movable plug in the housing to compress the powdered mica and cause the housing to force the movable member against its seat.

6. A spring for yieldingly holding a movable member against a fixed member comprising, powdered mica, and means for confining the powdered mica and compressing it so that its expansive force will be exerted against the movable member in the direction to hold the movable member yieldingly against the fixed member.

SVEN JOHAN NORDSTROM.
JOYE C. HAUN.